(12) United States Patent
Lin et al.

(10) Patent No.: US 10,997,360 B2
(45) Date of Patent: May 4, 2021

(54) PAGE DISPLAY METHOD, DEVICE, AND SYSTEM, AND PAGE DISPLAY ASSIST METHOD AND DEVICE

(71) Applicant: GUANGZHOU UCWEB COMPUTER TECHNOLOGY CO., LTD., Guangzhou (CN)

(72) Inventors: Wenlong Lin, Guangzhou (CN); Changyun Huang, Guangzhou (CN); Ming Cai, Guangzhou (CN)

(73) Assignee: Guangzhou UCWeb Computer Technology Co., Ltd., Guangzhou (CN)

( * ) Notice: Subject to any disclaimer, the term of this patent is extended or adjusted under 35 U.S.C. 154(b) by 29 days.

(21) Appl. No.: 15/970,293

(22) Filed: May 3, 2018

(65) Prior Publication Data

US 2018/0253406 A1    Sep. 6, 2018

Related U.S. Application Data

(63) Continuation of application No. PCT/CN2016/104505, filed on Nov. 4, 2016.

(30) Foreign Application Priority Data

Nov. 5, 2015    (CN) .......................... 201510750632.4

(51) Int. Cl.
*G06F 40/14* (2020.01)
*G06F 16/955* (2019.01)
*G06F 16/438* (2019.01)

(52) U.S. Cl.
CPC ............ *G06F 40/14* (2020.01); *G06F 16/438* (2019.01); *G06F 16/955* (2019.01)

(58) Field of Classification Search
CPC ....... G06F 40/14; G06F 16/955; G06F 16/438
See application file for complete search history.

(56) References Cited

U.S. PATENT DOCUMENTS 6,625,581 B1    9/2003    Perkowski
7,210,093 B1    4/2007    Dutta
(Continued)

FOREIGN PATENT DOCUMENTS

CN    102929971 A    2/2013
CN    103577479 A    2/2014
(Continued)

OTHER PUBLICATIONS

Chinese Patent Application No. 201510750632.4, First Office Action dated Oct. 20, 2016.
(Continued)

*Primary Examiner* — Kyle R Stork
(74) *Attorney, Agent, or Firm* — Sheppard Mullin Richter & Hampton LLP

(57) ABSTRACT

A page display method, apparatus, and system, and a page display assist method and apparatus are provided. A target page that a user desires to visit is searched for a multimedia resource, and a type of the multimedia resource is identified; and if a multimedia resource is found, a multimedia player corresponding to a type of the multimedia resource is inserted into the target page. By means of searching a target page that a user desires to visit for a multimedia resource and identifying a type of the multimedia resource, and then, inserting a corresponding multimedia player according to the identified type of the multimedia resource, a multimedia resource in a page can be played online and browsing experience of a user is improved.

11 Claims, 6 Drawing Sheets

(56) References Cited

U.S. PATENT DOCUMENTS

| | | | |
|---|---|---|---|
| 7,860,820 | B1 | 12/2010 | Rajkumar |
| 8,041,781 | B2 | 10/2011 | Martinez et al. |
| 8,055,708 | B2 | 11/2011 | Chitsaz et al. |
| 8,385,813 | B2 | 2/2013 | Rao |
| 8,881,217 | B2 | 11/2014 | Stallings et al. |
| 9,594,730 | B2 * | 3/2017 | Rajan .................... G06F 40/137 |
| 2003/0144873 | A1 | 7/2003 | Keshel |
| 2004/0059776 | A1 * | 3/2004 | Pitzel .................... G06F 16/284 |
| | | | 709/203 |
| 2005/0060351 | A1 | 3/2005 | Rahman |
| 2006/0015637 | A1 | 1/2006 | Chung |
| 2006/0091203 | A1 | 5/2006 | Bakker et al. |
| 2007/0136811 | A1 * | 6/2007 | Gruzman .............. G06F 21/562 |
| | | | 726/24 |
| 2008/0065632 | A1 * | 3/2008 | Nam ...................... G06F 16/957 |
| 2008/0092181 | A1 | 4/2008 | Britt |
| 2008/0319856 | A1 * | 12/2008 | Zito ........................ G06Q 30/02 |
| | | | 705/14.73 |
| 2009/0089448 | A1 | 4/2009 | Sze et al. |
| 2009/0125510 | A1 | 5/2009 | Graham et al. |
| 2009/0320077 | A1 | 12/2009 | Gazdzinski |
| 2012/0297311 | A1 | 11/2012 | Duggal |
| 2014/0207911 | A1 * | 7/2014 | Kosmach ............ H04L 65/1083 |
| | | | 709/218 |
| 2014/0208235 | A1 | 7/2014 | Robinson et al. |
| 2014/0325323 | A1 | 10/2014 | Liu et al. |
| 2015/0163268 | A1 * | 6/2015 | Wegman .................... G06F 8/60 |
| | | | 709/203 |
| 2016/0173953 | A1 | 6/2016 | Zhang |
| 2016/0283461 | A1 | 9/2016 | Guo et al. |

FOREIGN PATENT DOCUMENTS

| | | |
|---|---|---|
| CN | 104284250 | 1/2015 |
| CN | 104469467 | 3/2015 |
| CN | 104572953 A | 4/2015 |
| CN | 104834646 | 8/2015 |
| CN | 104866512 A | 8/2015 |
| CN | 105589922 A | 5/2016 |

OTHER PUBLICATIONS

Chinese Patent Application No. 201510750632.4, Second Office Action dated Jan. 18, 2017.

Chinese Patent Application No. 201510750632.4, Third Office Action dated May 24, 2017.

First Search dated Sep. 29, 2016, issued in related Chinese Application No. 201510750632.4 (1 page).

PCT International Preliminary Report on Patentability dated May 17, 2018, issued in related International Application No. PCT/CN2016/104505 (14 pages).

International Search Report and Written Opinion for Application No. PCT/CN2016/104505, dated Jan. 25, 2017, 10 pages.

First Examination Report dated Oct. 21, 2020, issued in related Indian Application No. 201847017467, with English translation (8 pages).

Fifth Office Action dated Feb. 3, 2020, issued in related Chinese Application No. 201510750632.4, with English machine translation (15 pages).

* cited by examiner

PAGE DISPLAY METHOD, DEVICE, AND SYSTEM, AND PAGE DISPLAY ASSIST METHOD AND DEVICE

CROSS REFERENCE TO RELATED APPLICATIONS

This application is a continuation application of International Patent Application No. PCT/CN2016/104505, filed on Nov. 4, 2016, which claims priority to Chinese Patent Application No. 201510750632.4, filed with the Chinese Patent Office on Nov. 5, 2015 and entitled "PAGE DISPLAY METHOD, DEVICE, AND SYSTEM, AND PAGE DISPLAY ASSIST METHOD AND DEVICE." The entire content of the above-referenced applications is incorporated herein by reference in their entirety.

TECHNICAL FIELD

This application relates to display technologies, and in particular, to a page display method, apparatus, and system, and a page display assist method and apparatus.

RELATED ART

With development of networks and the related technologies thereof, nowadays, people spend more time on electronic devices. For example, people browse web pages, view multimedia videos, enjoy multimedia music, read books, and so on by means of electronic devices such as computers, mobile phones, and IPADs.

However, currently, many websites do not have a capability of playing a multimedia resource (which may be a resource such as a video, music, or a book) online, so that after logging into the websites, a user can view a multimedia resource by using a local player only after downloading the multimedia resource to a local host by using a browser or other download software. User experience is relatively poor, and this does not agree with a development trend of the Internet.

For example, when a user visits the foregoing resource website with a mobile phone, because the website does not have an online playback capability, the user needs to download a multimedia resource in the website by using a browser to a local host, and then, call a local browser or a built-in APP in the mobile phone, so as to play the multimedia resource.

In view of the above, multimedia resources in many websites are merely considered as downloaded resources, and an online playback attribute of the multimedia resources is not utilized. Therefore, a page display method, device, and system and a page display assist method and device are desired, by means of which a multimedia resource in a page can be played online.

SUMMARY

A technical problem to be resolved by this application is to provide a page display method, device, and system, capable of playing a multimedia resource in a page online.

According to an aspect of this application, a page display method is disclosed, including:

searching a target page that a user desires to visit for a multimedia resource, and identifying a type of the multimedia resource; and if a multimedia resource is found, inserting a multimedia player corresponding to a type of the multimedia resource into the target page.

Hence, a target page that a user desires to visit can be processed, to find a multimedia resource in the target page and identify a type of the multimedia resource, and then, a corresponding multimedia player is inserted according to the identified type of the multimedia resource. In this way, the multimedia resource in the page can be played online, and the user's browsing experience is improved.

In some embodiments, the method may further include: determining whether the target page includes a multimedia resource based on a URL address of the target page and a preset URL rule.

Preferably, the URL rule includes a list including one or more URL addresses, and the step of determining whether the target page includes a multimedia resource based on a URL address of the target page and a preset URL rule includes:

obtaining a target URL address of the target page;

determining whether a match of the target URL address exists in the one or more URL addresses in the list; and if yes, determining whether the target page includes a multimedia resource.

Preferably, the URL rule includes a preset address format, and the step of determining whether the target page includes a multimedia resource based on a URL address of the target page and a preset URL rule includes:

obtaining a target URL address of the target page, where the target URL address has a corresponding target address format;

determining whether the target address format is consistent with the preset address format; and if yes, determining whether the target page includes a multimedia resource.

Hence, preliminary determination may be first performed on a target page that a user desires to visit, whether the target page includes a multimedia resource is preliminarily determined, if it is determined that the target page includes a multimedia resource, an operation of searching the target page for the multimedia resource is further performed, and for a page that is determined to not include a multimedia resource, content of the page can be directly displayed to the user.

For example, whether the target page includes a multimedia resource can be determined by matching a preset URL rule with a URL address of the target page. The URL rule may be a preset list including a plurality of URL addresses, and a URL address belonging to the list may be considered to include a multimedia resource. In this case, whether a URL address of the target page includes a multimedia resource may be determined according to a preset URL list (or a URL address database). In addition, the URL rule may alternatively be a manually set URL address format, and a URL address conforming to the format may be considered to be a page including a multimedia resource.

In some embodiments, a server may determine whether the target page includes a multimedia resource. If the server determines that the target page includes a multimedia resource, the server delivers a resource identification configuration item to a client, and the client searches, in response to the received resource identification configuration item, the target page for the multimedia resource and identifies a type of the multimedia resource.

Thus, the work of determining whether the target page includes a multimedia resource is handed to the server for completion, and the work of searching the target page for a multimedia resource and identifying a type of the multimedia resource is handed to client for completion. In this way, responsibilities can be shared by means of configuration that is performed to some extent, and complexity of the method is simplified.

In some embodiments, the step that the server delivers a resource identification configuration item to a client includes: inserting, by the server, the resource identification configuration item into a header of a page file of the target page; and sending, by the server, the target page including the resource identification configuration item to the client. When parsing a page file, the client can obtain the resource identification configuration item from the header, so as to perform the operations of searching for and identifying a multimedia resource based on the resource identification configuration item.

In some embodiments, if the server determines that the target page includes a multimedia resource, the server may divide content of the target page into a plurality of blocks, and annotate the blocks, where the resource identification configuration item includes annotation information of the blocks; and the client identifies the plurality of blocks based on the annotation information, searches the plurality of blocks of the target page for a multimedia resource according to a predetermined priority order, and identifies a type of the found multimedia resource.

The plurality of blocks may include a download link block, a content title block, a page title block, and a text block, and the client can search for the multimedia resource block by block according to a predetermined priority order of the content title block, the download link block, the page title block, and the text block.

If the server determines that the target page includes a multimedia resource, the server may further divide content in the target page into blocks, annotate the divided blocks, and then, send annotation information of the blocks to the client. In this way, the client may identify the blocks divided by the server according to the annotation information, and then, the client may search for the multimedia resource block by block according to a predetermined priority order, so that searching efficiency is improved.

The resource identification configuration item may further include a multimedia player insertion position; and the client may insert, based on the multimedia player insertion position, a multimedia player corresponding to the type of the multimedia resource at a corresponding position of the target page. The client can insert a corresponding multimedia player into the target page according to a multimedia player insertion position preset by a server end.

In some embodiments, if the server determines that the target page includes a multimedia resource, the server may further configure a client program and a related cascading style sheet (CSS), and deliver the client program and the CSS to the client; and the client may perform, based on the client program and the CSS, the step of searching a target page that a user desires to visit for a multimedia resource, and identifying a type of the multimedia resource. Thus, the client performs, based on the client program and the CSS delivered by the server end, the operation of searching a target page for a multimedia resource, and identifying a type of the multimedia resource.

According to another aspect of this application, a page display assist method executed on a server end is further disclosed, including: determining whether a target page that a user desires to visit includes a multimedia resource; and if it is determined that the target page includes a multimedia resource, delivering a resource identification configuration item to a client, where the resource identification configuration item enables the client to search the target page for the multimedia resource and identify a type of the multimedia resource. The server end may select by screening a target page including a multimedia resource, and may deliver an instruction of searching for the multimedia resource and identifying a type of the multimedia resource to a client.

The step of delivering a resource identification configuration item to a client may include: inserting, by the server, the resource identification configuration item into a header of a page file of the target page; and sending the target page including the resource identification configuration item to the client.

In some embodiments, the method may further include: if it is determined that the target page includes a multimedia resource, dividing content of the target page into a plurality of blocks, and annotating the blocks, where the resource identification configuration item includes annotation information of the blocks.

The server end may further divide a page including a multimedia resource into plurality of blocks according to content of the page, correspondingly perform annotation, and send annotation information to the client, to facilitate the client searching for the multimedia resource block by block.

In some embodiments, the method may further include: if the server determines that the target page includes a multimedia resource, configuring, by the server, a client program used for searching the target page for the multimedia resource and identifying a type of the multimedia resource and a related CSS, and delivering the client program and the CSS to the client. In some other embodiments, the server may further deliver a program file for searching the target page for the multimedia resource and identifying the multimedia resource to the client.

According to another aspect of this application, a page display apparatus is further disclosed, which may include:

a multimedia resource searching and identifying module, configured to search a target page that a user desires to visit for a multimedia resource, and identify a type of the multimedia resource; and a multimedia player inserting module, configured to: if a multimedia resource is found, insert a multimedia player corresponding to a type of the multimedia resource into the target page.

According to another aspect of this application, a page display assist apparatus is further disclosed, which may include: a multimedia resource determining module, configured to determine whether a target page that a user desires to visit includes a multimedia resource; and a resource identification configuration item delivering module, configured to: if it is determined that the target page includes a multimedia resource, deliver a resource identification configuration item to a client, where the resource identification configuration item enables the client to search the target page for the multimedia resource and identify a type of the multimedia resource.

In some embodiments, the page display assist apparatus may further include: a blocking dividing module, configured to: if it is determined that the target page includes a multimedia resource, divide content of the target page into a plurality of blocks, annotate the blocks, and send annotation information of the blocks to the resource identification configuration item delivering module.

In some other embodiments, the page display assist apparatus may further include: a client program and cascading style sheet delivering module, configured to: if it is determined that the target page includes a multimedia resource, configure a client program used for searching the target page for the multimedia resource and identifying a type of the multimedia resource and a related CSS, and deliver the client program and the CSS to the client.

According to another aspect of this application, a page display system is further disclosed, which includes a client, where the client searches, in response to a page visit request of a user, a target page that the user desires to visit for a multimedia resource, and identifies a type of the multimedia resource; and if the client finds a multimedia resource, the client inserts a multimedia player corresponding to a type of the multimedia resource into the target page.

In some embodiments, the page display system may further include a server, where the client or the server determines whether the target page includes a multimedia resource based on a URL address of the target page and a preset URL rule.

The client may send the page visit request of the user to the server, and the server determines whether the target page includes a multimedia resource; and if the server determines that the target page includes a multimedia resource, the server delivers a resource identification configuration item to the client, and the client searches, in response to the received resource identification configuration item, the target page for the multimedia resource and identifies a type of the multimedia resource.

The server may insert the resource identification configuration item into a header of a page file of the target page and send the target page including the resource identification configuration item to the client.

If the server determines that the target page includes a multimedia resource, the server divides content of the target page into a plurality of blocks, and annotates the blocks, where the resource identification configuration item includes annotation information of the blocks; and the client identifies the plurality of blocks based on the annotation information, searches the plurality of blocks of the target page for a multimedia resource according to a predetermined priority order, and identifies a type of the found multimedia resource.

The resource identification configuration item may further include a multimedia player insertion position; and the client may insert, based on the multimedia player insertion position, a multimedia player corresponding to the identified type of the multimedia resource at a corresponding position of the target page.

If the server determines that the target page includes a multimedia resource, the server may further configure a client program and a related CSS, and deliver the client program and the CSS to the client; and the client performs, based on the client program and the CSS, the operation of searching a target page that a user desires to visit for a multimedia resource, and identifying a type of the multimedia resource.

According to another aspect of this application, a page display system is further disclosed, which includes a processor and a non-transitory computer-readable storage medium storing instructions. The instructions, when executed by the processor, cause the system to perform a method comprising: searching a target page that a user desires to visit for a multimedia resource, and identifying a type of the multimedia resource; and if a multimedia resource is found, inserting a multimedia player corresponding to a type of the multimedia resource into the target page.

In view of the above, based on the page display method, apparatus, system and the page display assist method and apparatus disclosed by this application, when browsing a page including a multimedia resource, a user can enjoy a multimedia resource online without downloading the multimedia resource.

BRIEF DESCRIPTION OF THE DRAWINGS

With reference to accompanying drawings, exemplary implementations of this disclosure are described in further detail, and the foregoing and other objectives, features, and advantages of this disclosure are more obvious. In the exemplary implementations of this disclosure, a same reference sign usually represents a same component.

DETAILED DESCRIPTION

Preferred implementations of this disclosure are described below in further detail with reference to accompanying drawings. Although the accompanying drawings show the preferred implementations of this disclosure, it should be understood that this disclosure can be implemented in various forms and should not be limited to the implementations described herein. On the contrary, the implementations are provided to make this disclosure more profound and complete, and can express the scope of this disclosure completely to a person skilled in the art.

I. Page Display System

Figure 1:
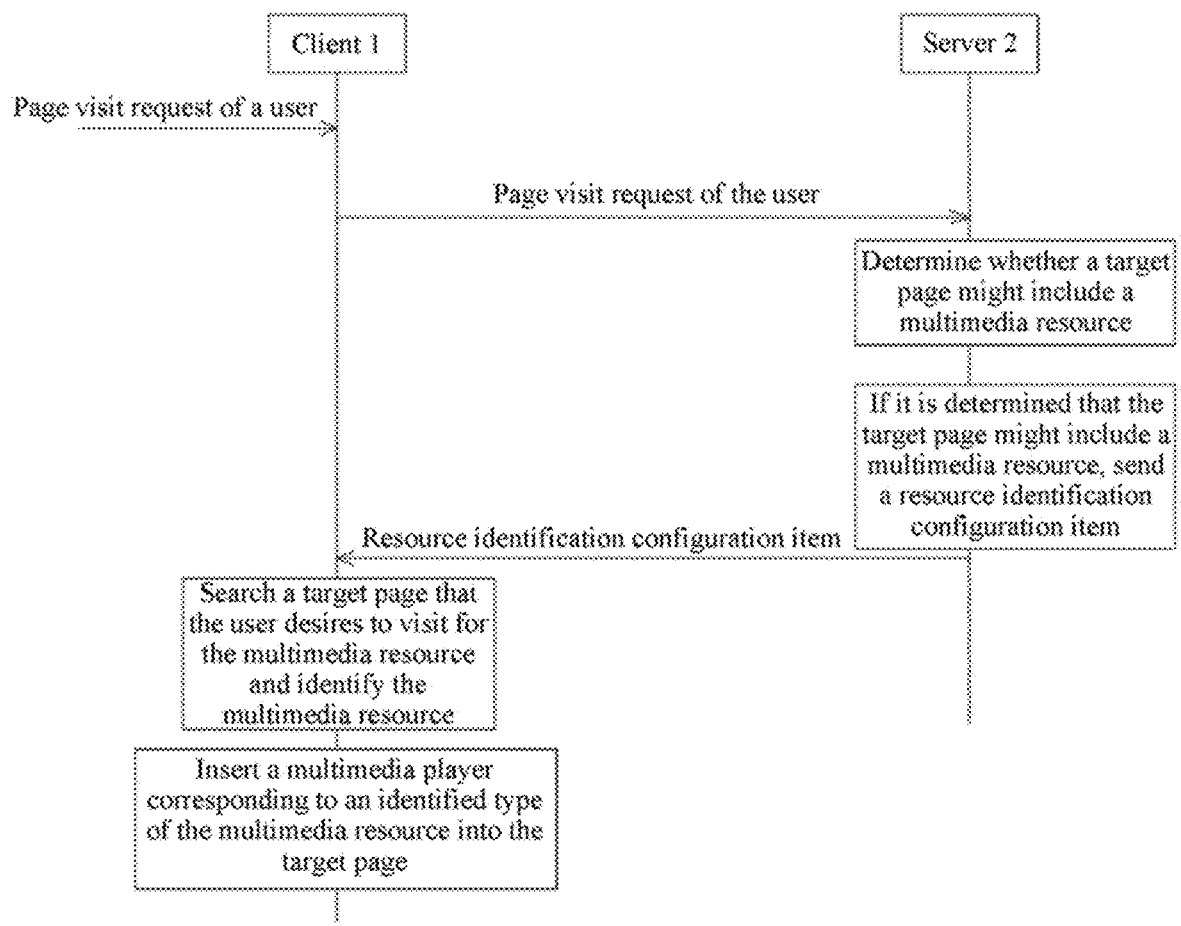
FIG. 1 is a schematic block diagram of a page display system according to an embodiment of this application.

FIG. 1 is a schematic block diagram of a page display system according to an embodiment of this application and is a schematic flowchart of functions of the system.

As shown in FIG. 1, a page display system in this embodiment of this application may include a client 1. The client 1 can search a page that a user desires to visit for a multimedia resource and identify a type of the multimedia resource, so as to display a multimedia resource that the page may include in the page that the user desires to visit.

Specifically, the client 1 may search, in response to a page visit request of a user, a target page that the user desires to visit for a multimedia resource, and identify a type of the multimedia resource. If the client 1 finds a multimedia resource, the client 1 may further insert a multimedia player corresponding to a type of the multimedia resource into the target page.

The client 1 may be a client browser or another client APP such as reading software or a music player. The target page may be a web page that the user desires to visit or a page that the user visits in other client software.

Hence, when the target page that the user desires to visit includes a multimedia resource, the client 1 searches the target page for the multimedia resource and identifies the multimedia resource, and then, can play the multimedia resource online by inserting a multimedia player corresponding to the identified multimedia resource at a predetermined position in the target page. In this way, a user can directly browse the multimedia resource in content of the page without downloading the multimedia resource in the target page, so that user experience is greatly improved.

Because not all pages include a multimedia resource, if the client 1 performs, for each target page that a user desires to visit, an operation of searching the target page for and identifying a multimedia resource, a workload of the client 1 is unnecessarily increased, and this is inappropriate. Therefore, as shown in FIG. 1, a page display system of this application may optionally include a server 2. The client 1 may send the page visit request of the user to the server 2, and the server 2 determines whether the target page may include a multimedia resource. Certainly, the client 1 may alternatively determine whether the target page may include a multimedia resource.

Whether a target page may include a multimedia resource can be preliminarily determined by determining the target page by the client 1 or server 2. For a target page that may include a multimedia resource, the client 1 may perform a related operation of searching the target page for a multimedia resource and identifying a type of the multimedia resource. In this way, on the one hand, the client 1 does not need to perform an operation of searching for and identifying a multimedia resource on each page, so that work efficiency is improved, and on the other hand, experience of a user when browsing a page that does not include a multimedia resource is not affected.

As shown in FIG. 1, the server 2 may determine whether the target page may include a multimedia resource. If the server determines that the target page may include a multimedia resource, the server 2 may deliver a resource identification configuration item to the client 1, and the client 1 searches, in response to the received resource identification configuration item, the target page for the multimedia resource and identifies a type of the multimedia resource.

The resource identification configuration item enables the client to perform an operation of searching the target page for the multimedia resource and identifying a type of the multimedia resource. Therefore, the resource identification configuration item may be an instruction program for starting the client to perform a searching and identifying operation in the target page.

The server 2 may insert the resource identification configuration item into a header of a page file of the target page and send the target page including the resource identification configuration item to the client 1. That is, the resource identification configuration item may be embedded into a header of a page file of the target page in a form of a script program, and then, the target page including the resource identification configuration item is sent to the client 1. In this way, the client 1 can automatically search the target page for a multimedia resource and identifying a type of the multimedia resource according to the target page fed back by the server 2.

In addition, as shown in FIG. 1, if it is determined that the target page may include a multimedia resource, the server 2 may further divide content of the target page into a plurality of blocks, annotate the blocks, and send the resource identification configuration item carrying annotation information of the blocks to the client 1.

The client 1 may identify the plurality of blocks divided by the server 2 based on the received annotation information, search the plurality of blocks of the target page for a multimedia resource according to a predetermined priority order, and identify a type of the found multimedia resource. The plurality of blocks may include a download link block, a content title block, a page title block, and a text block. In this case, the client can search for the multimedia resource block by block according to a predetermined priority order of the content title block, the download link block, the page title block, and the text block.

In some embodiments, the resource identification configuration item delivered by the server 2 to the client 1 may further include a multimedia player insertion position; and the client 1 may insert, based on the multimedia player insertion position, a multimedia player corresponding to the type of the multimedia resource at a corresponding position of the target page.

In addition, an operation S100 performed by the client may be performed by a built-in program of the client, or may be delivered by the server 2 to a program of the client 1 for execution.

Specifically, if the server 2 determines that the target page may include a multimedia resource, the server 2 may configure a client program and a related CSS, and deliver the client program and the CSS to the client 1. The client 1 performs, based on the client program and the CSS, the operation of searching a target page that a user desires to visit for a multimedia resource, and identifying a type of the multimedia resource.

The server 2 may insert the client program and the cascading style sheet into the target page, and deliver them, together the resource identification configuration item inserted into the page, to the client 1. In this way, the client can automatically search the target page for and identify the multimedia resource according to the received target page.

Structures that the page display system of this application may include and functions that related structure may have are described above in detail with reference to FIG. 1.

A working process of the page display system of this application is described below in detail by using specific embodiments.

The embodiment described below explains the working process of the page display system of this application by using an example in which a user visits a web page, and it should be understood that the page display system of this application is also applicable to another page that the user visits (such as a page in a software APP).

The page display system of this embodiment includes a client and a server, applied to web page display. The client may be a client browser and may receive a web page visit request of a user and send the web page visit request to the server.

The server may determine, according to a preset URL rule, whether the target web page that the user desires to visit conforms to the URL rule. The URL rule may be a pre-established database including a URL of a multimedia resource, or may be a manually preset URL format.

Preferably, the URL rule includes a list including one or more URL addresses, and the step of determining whether the target page includes a multimedia resource based on a URL address of the target page and a preset URL rule includes:

obtaining a target URL address of the target page;

determining whether a match of the target URL address exists in the one or more URL addresses in the list; and if yes, determining whether the target page includes a multimedia resource.

Preferably, the URL rule includes a preset address format, and the step of determining whether the target page includes a multimedia resource based on a URL address of the target page and a preset URL rule includes:

obtaining a target URL address of the target page, where the target URL address has a corresponding target address format;

determining whether the target address format is consistent with the preset address format; and if yes, determining whether the target page includes a multimedia resource.

For example, the URL rule may be set to the following format:

```
<?xmlversion="1.0" encoding="utf-8"?>
<template>-
<sitename="targetdomain.com">
<mode
        urlreg="(`http://(www\.)?(.+\.)?targetdomain\.cc/
        files/[0-9]+/.+\.html?
        $) "rule_spec="mcDownload">
</mode>
</site>
</template>
```

In this way, the server performs regular rule matching on a URL that a user desires to visit and a set URL rule, and if the URL matches the URL rule, it can be considered that the URL that the user desires to visit may include a multimedia resource.

When the server determines, according to the preset URL rule, that the URL that the user desires to visit may include a multimedia resource, the server may mark different contents in a page by means of Xpath in advance. That is, block division may be performed on the content in the page by means of Xpath. For example, the content in the page may be divided into a download link block (link), a content title block (title), a page title block (document.title) and a text block (text), and then, positions of the blocks may be annotated by using a corresponding program. For example, annotation may be performed by using the following code.

```
<?xml version="1.0" encoding="utf-8"?>
<template>
<site name="targetdomain.com">
<url_prefix
name="`http://(www\.)?(.+\.)?targetdomain\.com/files/[0-9]+/.+\.html?$">
<field name="title" path="//div[@class='title']" type="text"/>
<field name="link" path="//div[@class='downLink']//a[@class='dwnLink']"
type="raw_html"/>
<field name="size"
path="//div[@class='fshow']//span[@class='bld']|//div[@class='downLink']/a[@class='dwn
Link']/b" type="text"/>
<field name="videoPos" path="//body//div[@class='logo']"
type="raw_html"/>
</url_prefix>
</site>
</template>
```

(Field descriptions include: title: a resource title; link: a resource address; size: a size or sizes of one or more media resources; videoPos: a player insertion position), where the foregoing code illustratively indicates the content that can be extracted. It should be appreciated that the content title block (title) and the page title block (document.title) in the page may alternatively extracted according to the foregoing encoding manner.

To enable the client to identify the foregoing annotation information better, the server may convert the annotation information into a JSON format that can be easily read by the client, and the converted JSON format is as follows:

```
[
{
'name': 'title',
'path': '//div[@class="title"]'
},
{
'name': 'link',
'path': '//div[@class="content"]/div[2]//a[@class="touch"]'
},
{
'name': 'size',
'path':
'//div[@class="content"]/div[2]/div[2]|//div[@class="menu_row"]//a[@class="touch"][
contains(text( ),"x")]'
},
{
'name': 'videoPos',
'path': '//body//div[@class="head"]'
}
]
```

Then, the server may insert the converted JSON data into a <head> region of the target web page, and send the converted JSON data together with the target web page to the client. The <head> region inserted into the target web page may be implemented by using the following code:

```
<script type="text/javascript">
var uc_json_detail=[the foregoing JSON data];
</script>
```

If the server determines, according to the preset URL rule, that the URL that the user desires to visit may include a multimedia resource, the server delivers a client resource (a JS and a CSS) to the client. The client resource may alternatively be embedded into a web page file. For example, the client resource may be inserted into a header of the web page file, and then, the web page file is delivered to the client.

After receiving the client resource delivered by the server, the client may perform key steps such as a media identification algorithm.

Specifically, the client may read the JSON data, store it into the Window (window.jsonPath), then, convert Xpath in the JSON convert into DOM object data, and store it into the Window (window.jsonData). In this way, the window.json-Data data can be used, and with reference to the multimedia identification algorithm, a multimedia type (MUSIC_TYPE and VIDEO_TYPE) is identified.

The multimedia algorithm may include:

1) A common format of a multimedia type is defined, and can be implemented by using the following code:

```
var formatConfig= {
music: ['mp3', 'wav', 'amr', 'mid'],
video: ['mp4', '3gp', 'avi']
};
```

2) Analysis and query are sequentially performed on jsonData according to a priority, and a formatConfig suffix keyword is identified. Data composition and the priority may be a sequence of a content title block (title), a download link block (link), a page title (document.title), and a text block (text).

Implementation code may be as follows:

```
//parameter data is an object including a link, a title, or text
var analyserFormat = function(data) {
var reg_result = null;
for (var cf in formatConfig) {
var cfdata = formatConfig[cf], reg_str = cfdata.join('|');
if (data.title) {
reg_result = _analyFormatByText(data.title, reg_str);
if (reg_result) break;
}
if (data.link && data.link.nodeName.toLowerCase( ) ==='a') {
- reg_result = _analyFormatByLink(data.link, reg_str);
if (reg_result) break;
}
if (document.title) {
reg_result = _analyFormatByTitleTag(reg_str);
if (reg_result) break;
}
if (data.text){
reg_result = _analyFormatByText(data.text, reg_str);
if (reg_result) break;
}
}
if(reg_result && reg_result.length > 0) {
return reg_result[0];
} else {
return";
}
};
//download link analysis: [text value, href attribute value, and title attribute value]
var _analyFormatByLink = function(link, regexp) { var regObj = new RegExp(regexp, 'i'), arr =[ ],
result ='';
if (link.nodeType === 1 && link.tagName.toLowerCase( ) === 'a') { arr.push(link.href); arr.push(link.title); arr.push(link.textContent.trim( ));
} else if (link.nodeType === 2 || link.nodeType === 3) {
arr.push(link.textContent.trim( ));
}
for (var i = 0; i < arr.length; i++) {
if (arr[i] && regObj.exec(arr[i])) { result = regObj.exec(arr[i]); break;
}
}
return result;
};
//analyzing a page title
var _analyFormatByTitleTag = function(regexp) {
var regObj = new RegExp(regexp, 'i');
return regObj.exec(document.title);
};
```

-continued

```
//according to introduced text content, analyzing a format
var _analyFormatByText = function(text, regexp) {
var regObj = new RegExp(regexp,'i');
return regObj.exec(text);
};
```

3) A resource type is identified by using an analyserFormat method, and is assigned with a value pageType=MUSIC_TYPE or VIDEO_TYPE. Thus, a type of the multimedia resource included in the page can be identified. After the type of the multimedia resource included in the page can be identified, a corresponding multimedia player can be assembled on the client and inserted into a preset position.

```
Implementation code thereof may be as follows:
if (pageType === MUSIC_TYPE) {
createMusicTemp( );
} else if (pageType === VIDEO_TYPE) {
createVideoTemp( );
}
//music player template
var createMusicTemp = function(options) {
var bannerTemp = template('list/music', options), //template data
    oBanner=     doc.createElement('div');    oBanner.id    =    'uc_music_player';
oBanner.className = 'uc-banner-wrapper'; oBanner.innerHTML =bannerTemp;
    body.appendChild(oBanner);
};
//video player template
var createVideoTemp = function(options) {
var playerTemp = template('list/video', options), //template data
oPlayer = doc.createElement('div'),
    oPos = options.videoPos; //video insertion position oPlayer.id = 'uc_video_player';
oPlayer.innerHTML = playerTemp;
    if (oPos && oPos.parentNode) {
    oPos.parentNode.insertBefore(oPlayer, oPos.nextSibling);
    }
};
```

Thus, a player corresponding to the type of the multimedia resource in the page can be inserted into the page.

Figure 2:
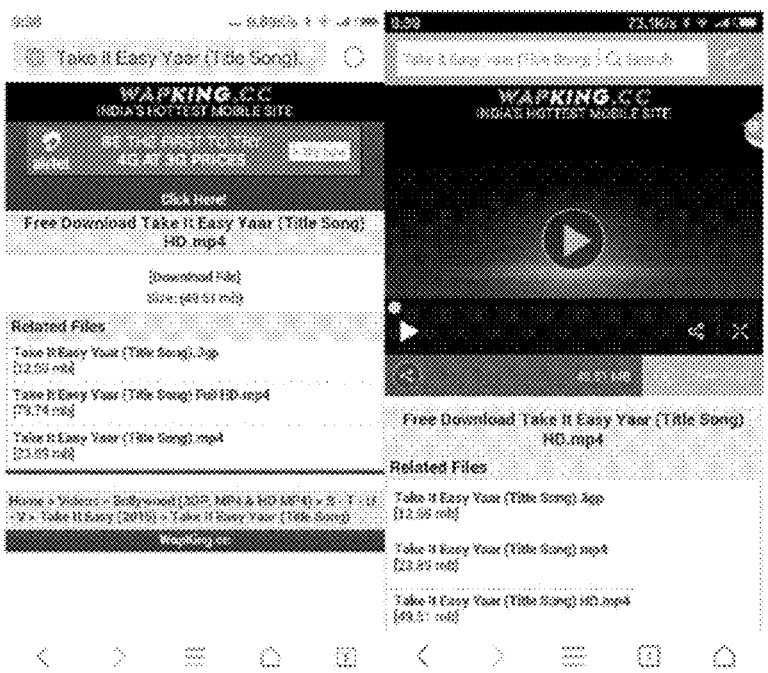
FIG. 2 and FIG. 3 are diagrams of comparison between an effect of opening a page including a multimedia resource by using a display system of this application and an effect of opening a page including a multimedia resource by using an existing apparatus.
Figure 3:
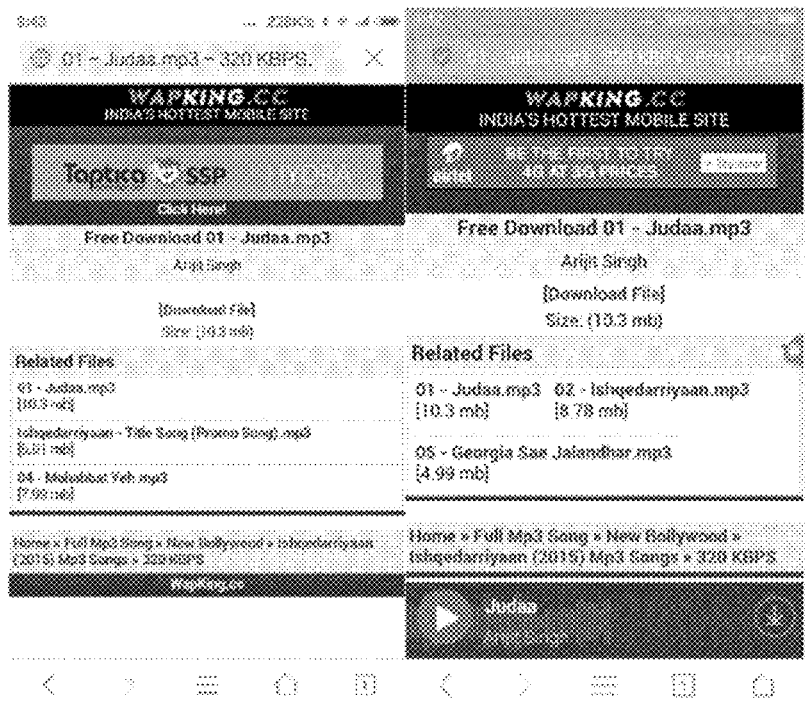

FIG. 2 and FIG. 3 are diagrams of comparison between an effect of opening a page including a multimedia resource by using a display system of this application and an effect of opening a page including a multimedia resource by using an existing apparatus.

A left image of FIG. 2 is a diagram of an effect when a web page carrying a video resource is opened by using an existing client, and a right image of FIG. 2 is a diagram of an effect when the same web page carrying a video resource is opened by using a client in the page display system of this application. A left image of FIG. 3 is a diagram of an effect when a web page carrying a music resource is opened by using an existing client, and a right image of FIG. 3 is a diagram of an effect when the same web page carrying a music resource is opened by using a client in the page display system of this application.

It can be learned by comparison that of the page display system of this application can identify the multimedia resource included in the page, and insert a corresponding multimedia player into the page, so as to play the multimedia resource in the page online.

The page display system of this application is described above in detail, and the working process of the page display system of this application is further described above by means of specific embodiments. A page display method, a page display assist method, and corresponding devices disclosed by this application are described below.

Most steps or functions in the methods and apparatuses described below are the same as the functions of the system described above. To avoid repetition, key steps and structures that the methods and apparatuses may include are described herein, some details in the steps and structures are not described again, and reference may be made to the corresponding descriptions above.

II. Page Display Method and Page Display Assist Method

Figure 4:
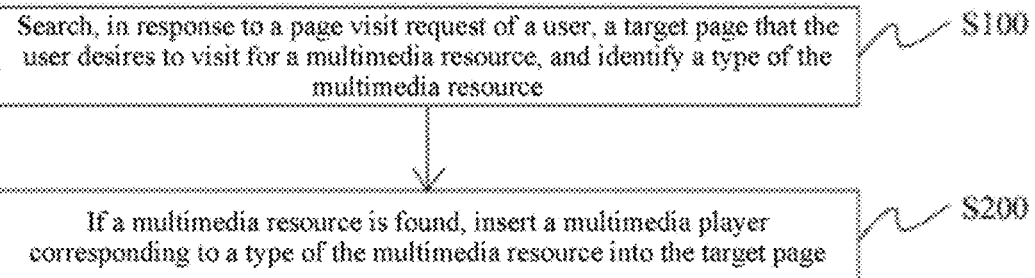
FIG. 4 is a schematic flowchart of a page display method of this application.

FIG. 4 is a schematic flowchart of a page display method of this application. The page display method of this application may be executed by a client.

Step S100: Search, in response to a page visit request of a user, a target page that the user desires to visit for a multimedia resource, and identify a type of the multimedia resource.

Step S200: If a multimedia resource is found, insert a multimedia player corresponding to a type of the multimedia resource into the target page.

Figure 5:
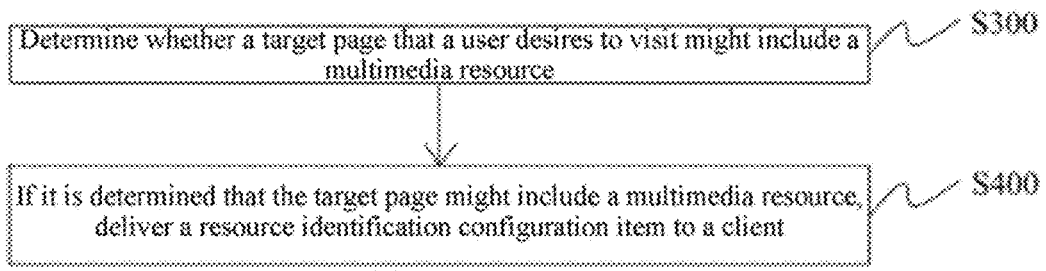
FIG. 5 is a schematic flowchart of a page display assist method of this application.

FIG. 5 is a schematic flowchart of a page display assist method of this application. The page display assist method of this application may be executed by a client.

Step S300: Determine whether a target page that a user desires to visit includes a multimedia resource.

Whether the target page includes a multimedia resource may be determined based on a URL address of the target page and a preset URL rule. The URL rule may be a URL rule that is preset by summarizing a URL principle of a web page including a multimedia resource, and whether a target page may include a multimedia resource can be determined according to the set URL rule. In addition, the URL rule may alternatively be a preset list including a plurality of URL addresses, and a URL address belonging to the list may be considered to be likely to include a multimedia resource.

Specifically, a plurality of URLs including a multimedia resource may be pre-stored, and then, a URL of a target page is compared with the URLs in a database, to determine whether the target page may include a multimedia resource.

In addition, step S300 may alternatively be executed by the client. That is, the client determines whether the target page includes a multimedia resource.

Step S400: If it is determined that the target page includes a multimedia resource, deliver a resource identification configuration item to a client, where the resource identification configuration item enables the client to search the target page for the multimedia resource and identify a type of the multimedia resource.

The resource identification configuration item may be inserted into a header of a page file of the target page and the target page including the resource identification configuration item is sent to the client.

Figure 6:
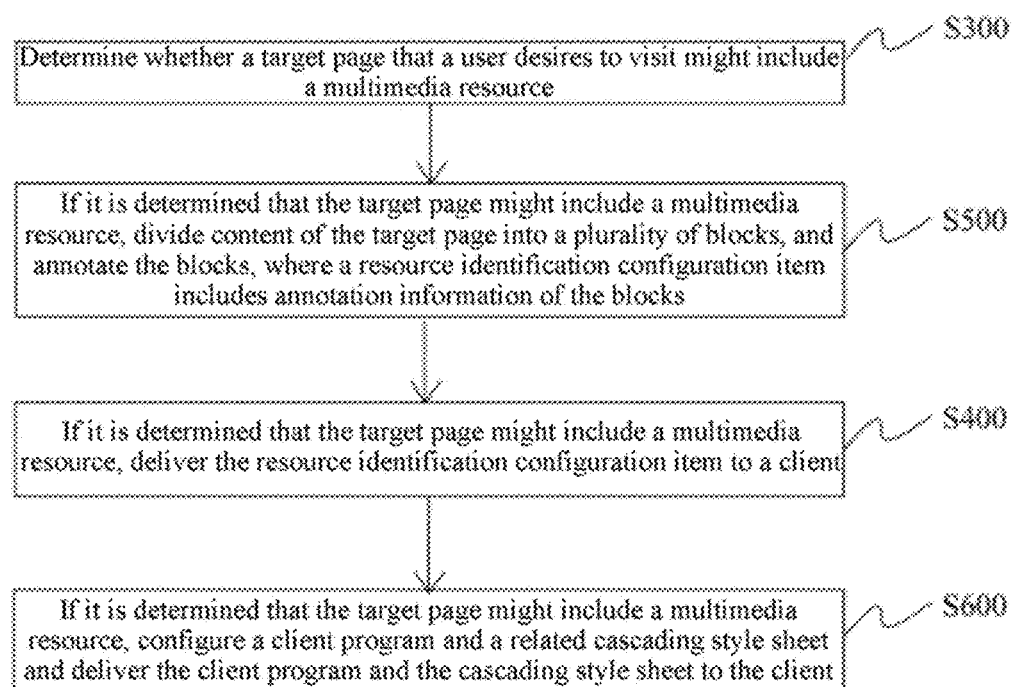
FIG. 6 is a schematic flowchart of an optional step that can be included by a page display assist method of this application.

FIG. 6 is a schematic flowchart of an optional step that can be included by a page display assist method of this application.

As shown in FIG. 6, the method may further optionally include step S500: If it is determined that the target page includes a multimedia resource, divide content of the target page into a plurality of blocks, and annotate the blocks, where the resource identification configuration item includes annotation information of the blocks.

As shown in FIG. 6, the method may further optionally include step S600: If a server determines that the target page includes a multimedia resource, the server configures a client program used for searching the target page for the multimedia resource and identifying a type of the multimedia resource and a related CSS and delivers the client program and the CSS to the client.

FIG. 6 shows a case in which step S600 is performed after step S400 and step S500, and it should be understood that step S600 may be performed synchronously with step S400 and step S500 or may be performed before step S400 and step S500.

Thus, the page display method and the page display assist method of this application are completely described. In addition, it should be understood that the page display assist method of this application may be applied to the page display method of this application. That is, the page display method of this application may further include related steps in the page assist method.

III. Page Display Device and Page Display Assist Device

Figure 7:
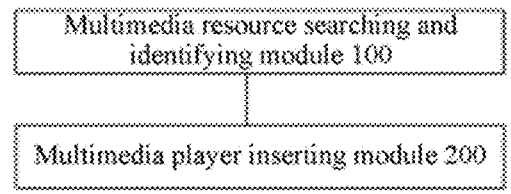
FIG. 7 is a schematic block diagram of a page display apparatus of this application.

FIG. 7 is a schematic block diagram of a page display device of this application.

As shown in FIG. 7, the page display device includes a multimedia resource searching and identifying module 100 and a multimedia player inserting module 200.

The multimedia resource searching and identifying module 100 is configured to search a target page that a user desires to visit for a multimedia resource, and identify a type of the multimedia resource.

The multimedia player inserting module 200 is configured to: if a multimedia resource is found, insert a multimedia player corresponding to a type of the multimedia resource into the target page.

Figure 8:
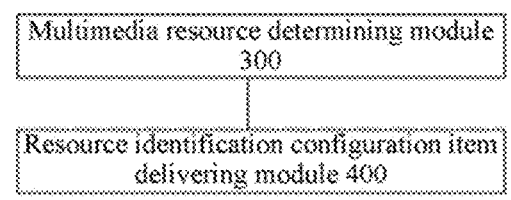
FIG. 8 is a schematic block diagram of a page display assist apparatus of this application.

FIG. 8 is a schematic block diagram of a page display assist device of this application.

As shown in FIG. 8, the page display assist device includes a multimedia resource determining module 300 and a resource identification configuration item delivering module 400.

The multimedia resource determining module 300 is configured to determine whether a target page that a user desires to visit includes a multimedia resource.

The resource identification configuration item delivering module 400 is configured to: if it is determined that the target page includes a multimedia resource, deliver a resource identification configuration item to a client, where the resource identification configuration item enables the client to search the target page for the multimedia resource and identify a type of the multimedia resource.

Figure 9:
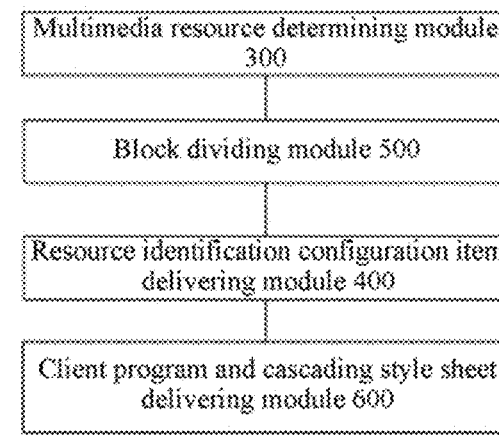
FIG. 9 is a schematic block diagram of an optional structure that can be included by a page display apparatus of this application.

FIG. 9 is a schematic block diagram of an optional structure that can be included by a page display apparatus of this application.

As shown in FIG. 9, the page display assist device may further optionally include a block dividing module 500. If it is determined that the target page includes a multimedia resource, the block dividing module 500 divides content of the target page into a plurality of blocks, annotates the blocks, and sends annotation information of the blocks to the resource identification configuration item delivering module.

As shown in FIG. 9, the page display assist device may further optionally include a client program and cascading style sheet delivering module 600.

The client program and cascading style sheet delivering module 600 is configured to: if it is determined that the target page includes a multimedia resource, configure a client program used for searching the target page for the multimedia resource and identifying a type of the multimedia resource and a related CSS, and deliver the client program and the CSS to the client.

Thus, the page display device and the page display assist device of this application are completely described. In addition, it should be understood that the page display assist device of this application may be applied to the page display device of this application. That is, the page display device of this application may further include related structures in the page assist device.

The page display method, device, and system, and the page display assist method and device according to this application are described above in detail with reference to accompanying drawings.

In view of the above, in the page display method, device, and system, and the page display assist method and device disclosed by this application, responsibilities can be shared by means of configuration that is performed to some extent, and complexity of an algorithm is simplified, so that a price-quality ratio is higher. Based on the page display method, device, system and the page display assist method and device disclosed by this application, when browsing a page including a multimedia resource, a user can enjoy a multimedia resource, such as a video, music, or an e-book, online without downloading the multimedia resource.

In addition, the method according to of this application may alternatively be implemented as a computer program, and the computer program includes computer program code instructions used for performing the foregoing steps defined in the foregoing method of this application. Alternatively, the method according to of this application may be implemented as a computer program product. The computer program product includes a computer readable medium, and the computer readable medium stores a computer program used for implementing functions defined in the foregoing method of this application. It would be understood by a person skilled in the art that various exemplary logic blocks, modules, circuits, and algorithm steps described with reference to the disclosure herein may be implemented as electronic hardware, computer software, or a combination of the two.

Figure 10:
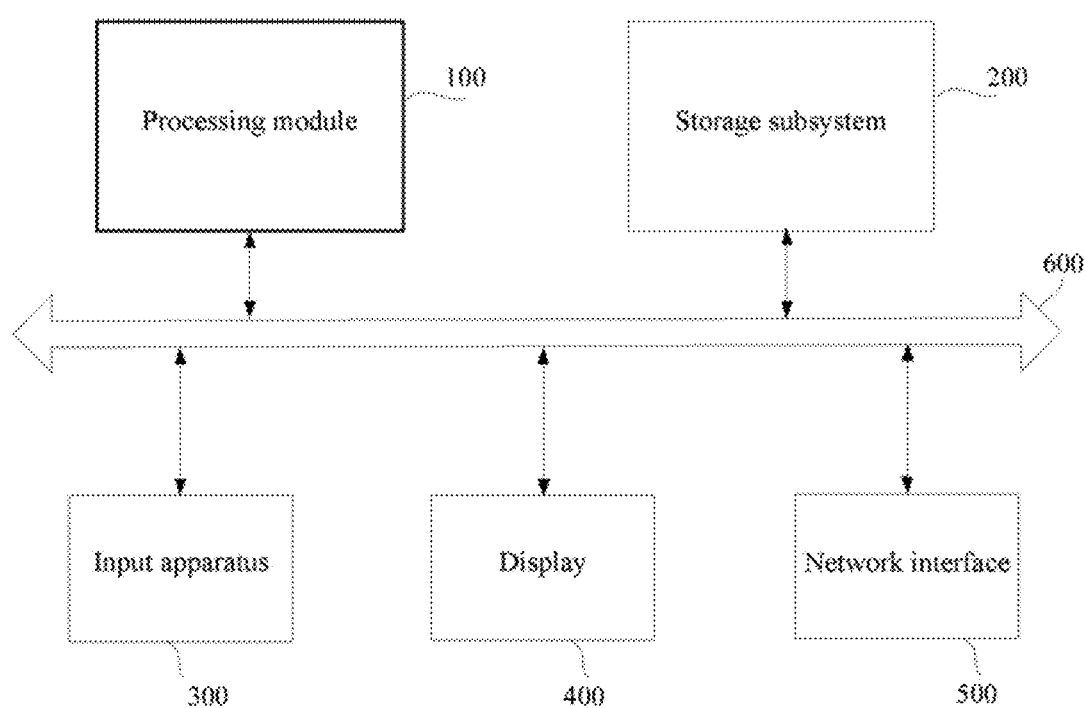
FIG. 10 is a structural block diagram of a computing device provided according to an implementation of this application.

FIG. 10 is a structural block diagram of a computing device provided according to an implementation of this application. The computing device may be implemented as a computer apparatus of various types such as a desktop computer, a tablet computer, a smartphone, a personal data assistant (PDA), an intelligent wearable device, or a computer apparatus of another type, but is not limited to any specific form. A computer may include a processing module 100, a storage subsystem 200, an input apparatus 300, a display 400, a network interface 500, and a bus 600.

The processing module 100 may be a multi-core processor or a processor including a plurality of the processor. In some embodiments, the processing module 100 may include a universal master processor and one or more special co-processors such as a graphic processing unit (GPU) and a digital signal processor (DSP). In some embodiment, the processor 100 may be implemented by using a customized circuit such as an application specific integrated circuit (ASIC) or a field programmable gate arrays (FPGA).

In some implementations, the processing module 100 may be a similar circuit executing an executable instruction stored thereon. In some other implementations, the processing module 100 may execute an executable instruction stored on the storage subsystem 200.

The storage subsystem 200 may include various store units such as a system memory, a read-only memory (ROM), and a persistent storage apparatus. The ROM may store static data or instructions needed by the processing module 100 or another module of the computer. The persistent storage apparatus may be a readable-writable storage apparatus. The persistent store apparatus may be a non-volatile store device that would not lose stored instructions and data even after the computer is powered off. In some implementations, a storage apparatus having a large capacity (such as a magnetic disk, an optical disc, or a flash memory) is used as a persistent storage apparatus. In some other implementations, the persistent storage apparatus may be a removable storage device (such as a floppy disk or an optical drive). The system memory may be a readable-writable storage device or a volatile readable-writable storage device such as a dynamic random-access memory. The system memory may store instructions and data needed by some or all processors during operation. In addition, the storage subsystem 200 may include a combination of any computer readable storage media, including various semiconductor storage chips (a DRAM, a SRAM, a SDRAM, a flash memory, a programmable read-only memory), and a magnetic disk and/or an optical disc may alternatively be used. In some implementations, the storage subsystem 200 may include a readable and/or writable removable storage device such as a compact disc (CD), a read-only digital versatile disc (such as a DVD-ROM or a dual-layer DVD-ROM), a read-only Blue-ray disc, an ultra density optical disc, a flash card (such as an SD card, a mini SD card, or a micro SD card), and a magnetic floppy disk. The computer readable storage media do not include a carrier or a transient electronic signal transmitted in a wireless or wired manner. In some implementations, the storage subsystem 200 can store one or more software programs that can be executed by the processing module 100 or resource files that need to be called. The resource files may include some third-party libraries, including, but not limited to, an audio library, a video library, a 2D graphic library, and a 3D graphic library.

A user interface may be provided by one or more user input apparatuses 300, a display 400, and/or one or more other user output devices. The input apparatus 300 may include an apparatus for inputting a signal into a computer by a user, and the computer can interpret a special user request or information included in the signal. In some implementations, a network address may be entered into the user interface by means of a keyboard, and web page content corresponding to the entered network address is displayed. In some implementations, the input apparatus 300 may include some or all of a keyboard button, a touchscreen, a mouse or another pointing device, a roller, a click wheel, a turntable, a key, a switch, a keypad, a microphone, and the like.

The display 400 may display an image generated by the computer and may include image devices of different types such as a cathode-ray tube (CRT) display, a liquid crystal display (LCD), a light-emitting diode (LED) display (including an organic light-emitting diode (OLED) display), a projection system, and the like, and a set of other supporting electronic apparatuses (such as a DAC, an ADC, and a signal processor). In some implementation, another user output device may alternatively be additionally provided, or the display 400 may be replaced with, for example, a signal light, a speaker, a contact sensor, or a printer.

In some implementations, the user interface may be provided by using a graphical user interface. Some visible graphical elements are defined in some regions in the display 400 as interaction objects or control objects that can be selected by a user by using the input apparatus 300. For example, the user may operate the user input apparatus 300 to move a specified position on a screen and enter a network address, to control the display 400 to display web page content corresponding to the network address. In some implementations, a touch device capable identifying user gestures is used as an input device, and the gestures are not necessarily associated with an array on the display 300.

The network interface 500 provides a sound and/or data communication function for the computer. In some implementations, the network interface 500 may include a radio frequency transceiver to transfer sound and/or data (for example, using a cellular phone technology such as 3G, 4G, or a data network technology of or EDGE or WiFi) and a GPS receiving module and/or other modules. In some implementations, the network interface 500 may provide an additional wireless network connection or an alternative wireless interface. The network interface 500 may be a combination of hardware (such as an antenna, a modem, a codec, and another analog and/or digital signal processing circuit) and a software module.

The bus 600 may include various systems, external devices, and chip buses connecting components inside the computer. For example, the bus 600 connects the processing apparatus 100 and the storage subsystem 200, and may alternatively connect the input apparatus 300 and the display 400. The bus 600 may alternatively connect the computer to the network through the network interface 500. In this case, the computer the serve as a part of a plurality of networked computer devices. Any or all components of the computer can be used in a coordinated manner in the implementations of this application.

Some implementations include an electronic element such as a microprocessor or a memory storing computer instructions and data in a computer readable storage medium. Many features described in the BRIEF DESCRIPTION OF THE DRAWINGS part can be implemented by executing method steps of the computer instructions stored on the computer readable storage medium. When the computer instructions are executed, the computer processing unit implements various functions of the instructions. An implementation of the program instructions or computer code may be machine code such as code obtained by compiling another high-level language by using a computer, an electronic element or a microprocessor having a parser.

It should be understood that the computer is illustrative. The computer may include functions (such as a mobile call, GPS, power supply management, one or more cameras, various connection ports for connecting external devices, or accessories) that are not specifically described. Further, specific functional modules of the computer 100 are described herein, and descriptions on the functional module are used for facilitating description, and do not mean specific physical configuration of functional components. In addition, the functional modules do not need to have one-to-one correspondence with physical modules. The modules may be configured to complete various operations. For example, by programming or setting a suitable control circuit, the modules may alternatively be re-configured according to initial settings. The embodiments of this application may be implemented by means of a combination of hardware and software in various devices including an electronic device.

This embodiment further provides a non-volatile computer readable storage medium. When the storage medium stores one or more modules (programs), and the one or more modules are applied to a computing device, the non-volatile readable storage medium can enable the computing device to execute instructions of the following steps:

searching a target page that a user desires to visit for a multimedia resource, and identifying a type of the multimedia resource; and if a multimedia resource is found, inserting a multimedia player corresponding to a type of the multimedia resource into the target page.

Optionally, the method may further include: determining whether the target page includes a multimedia resource based on a URL address of the target page and a preset URL rule.

Optionally, the URL rule includes a list including one or more URL addresses, and the step of determining whether the target page includes a multimedia resource based on a URL address of the target page and a preset URL rule includes: obtaining a target URL address of the target page; determining whether a match of the target URL address exists in the one or more URL addresses in the list; and if yes, determining whether the target page includes a multimedia resource.

Optionally, the URL rule includes a preset address format, and the step of determining whether the target page includes a multimedia resource based on a URL address of the target page and a preset URL rule includes: obtaining a target URL address of the target page, where the target URL address has a corresponding target address format; determining whether the target address format is consistent with the preset address format; and if yes, determining whether the target page includes a multimedia resource.

Optionally, a server determines whether the target page includes a multimedia resource. If the server determines that the target page includes a multimedia resource, the server delivers a resource identification configuration item to a client, and the client searches, in response to the received resource identification configuration item, the target page for the multimedia resource and identifies a type of the multimedia resource.

Optionally, the step that the server delivers a resource identification configuration item to a client includes: inserting, by the server, the resource identification configuration item into a header of a page file of the target page; and sending, by the server, the target page including the resource identification configuration item to the client.

Optionally, if the server determines that the target page includes a multimedia resource, the server divides content of the target page into a plurality of blocks, and annotates the blocks, where the resource identification configuration item includes annotation information of the blocks; and the client identifies the plurality of blocks based on the annotation information, searches the plurality of blocks of the target page for a multimedia resource according to a predetermined priority order, and identifies a type of the found multimedia resource.

Optionally, the plurality of blocks includes a download link block, a content title block, a page title block, and a text block, and the client searches for the multimedia resource block by block according to a predetermined priority order of the content title block, the download link block, the page title block, and the text block.

Optionally, the resource identification configuration item further includes a multimedia player insertion position; and the client inserts, based on the multimedia player insertion position, a multimedia player corresponding to the type of the multimedia resource at a corresponding position of the target page.

Optionally, if the server determines that the target page includes a multimedia resource, the server further configures a client program and a related CSS, and delivers the client program and the CSS to the client; and the client performs, based on the client program and the CSS, the operation of searching a target page that a user desires to visit for a multimedia resource, and identifying a type of the multimedia resource.

A non-volatile computer readable storage medium provided in this embodiment may further enable the computing device to execute instructions of the following steps:

determine whether a target page that a user desires to visit includes a multimedia resource; and if it is determined that the target page includes a multimedia resource, deliver a resource identification configuration item to a client, where the resource identification configuration item enables the client to search the target page for the multimedia resource and identify a type of the multimedia resource.

The flowcharts and block diagrams in the accompanying drawing show system architectures, functions, and operations that may be implemented by the system and methods according to a plurality of embodiments of this application. At this point, each block in the flowcharts or block diagrams may represent one module, one program segment, or one part of code, and the module, program segment, or one part of code includes one or more executable instructions used for implementing specified logical functions. It should also be noted that, in some alternative implementations, functions marked in the blocks may occur in a sequence different from that marked in the accompanying drawings. For example, two continuous blocks may actually be executed basically in parallel, and sometimes, they may be executed in an opposite sequence. This depends on involved functions. It should also be noted that, each block in the block diagrams and/or flowcharts and a combination of blocks in the block diagrams and/or flowcharts may be implemented by using a specific hardware-based system that implements or performs a specified function or operation or may be implemented by using a combination of specific hardware and a computer instruction.

The embodiments of this application are described above, and the foregoing descriptions are illustrative rather than exhaustive, and are not limited to the disclosed embodiments. Many modifications and changes are obvious to a person of ordinary skill in the art without departing from the scope and spirit of the described embodiments. The terms in this application are chosen to best explain the principles of the embodiments, actual application, or improvements to the technology in the market or to enable another person of ordinary skill in the art to understand the embodiments disclosed in this application.

What is claimed is:

1. A page display method at a client, comprising:
   obtaining a page visit request of a page;
   sending the page visit request to a server;
   obtaining, from the server, information relating to whether the page comprises a multimedia resource;
   in response to determining that the information indicates that the page comprises a multimedia resource:
      obtaining, from the server, resource information relating to a title, an address, a size, and an insertion position of the multimedia resource, in a header of a page file of the page;
      identifying, from at least a portion of the resource information, a type of the multimedia resource;
      inserting a multimedia player corresponding to the identified type of the multimedia resource based on the insertion position, the inserting comprising:
         if the type of the multimedia resource is a music resource, appending a child node corresponding to the multimedia player as a last child of a parent node corresponding to a DOM object of the page; and
         if the type of the multimedia resource is a video resource, appending a child node corresponding to the multimedia player before at least one other child node of a parent node corresponding to a DOM object of the page; and
      displaying the page with the multimedia resource using the inserted multimedia player; and
   in response to determining that the information indicates that the page does not comprise a multimedia resource, displaying the page to a user.

2. The page display method according to claim 1, wherein the information relating to whether the page comprises a multimedia resource is based on a URL address of the target page and a preset URL rule.

3. The page display method according to claim 2, wherein the URL rule comprises a list comprising one or more URL addresses, and the determining whether the page comprises a multimedia resource based on a URL address of the page and a preset URL rule comprises:
   obtaining a target URL address of the page;
   determining whether a match of the target URL address exists in the one or more URL addresses in the list; and
   in response to determining that a match of the target URL address exists in the one or more URL addresses in the list, determining that the page comprises a multimedia resource.

4. The page display method according to claim 2, wherein the URL rule comprises a preset address format, and the determining whether the page comprises a multimedia resource based on a URL address of the page and a preset URL rule comprises:
   obtaining a target URL address of the page, wherein the target URL address has a corresponding target address format;
   determining whether the target address format is consistent with the preset address format; and
   in response to determining that the target address format is consistent with the preset address format, determining that the page comprises a multimedia resource.

5. The page display method according to claim 2, wherein the obtaining information that the page comprises a multimedia resource further comprises:
   obtaining, from the server, a resource identification configuration for the client to search, in response to the received resource identification configuration item, the page for the multimedia resource, and identify the type of the multimedia resource.

6. The page display method according to claim 5, wherein the obtaining, from the server, a resource identification configuration item comprises:
   obtaining the resource identification configuration item in the header of the page file of the page.

7. The page display method according to claim 6, wherein if the information indicates that the page comprises a multimedia resource, the method further comprises:
   obtaining, by the client, content of the page divided into a plurality of blocks, the resource identification configuration item including annotation information of the blocks, for the client to identify the plurality of blocks based on the annotation information, search the plurality of blocks of the page for the multimedia resource according to a predetermined priority order, and identify the type of the found multimedia resource.

8. The page display method according to claim 7, wherein the plurality of blocks comprises a download link block, a content title block, a page title block, and a text block, and
   wherein the searching the plurality of blocks of the page the multimedia resource comprises searching for the multimedia resource, block by block, according to a predetermined priority order of the content title block, the download link block, the page title block, and the text block.

9. The page display method according to claim 8, wherein the resource identification configuration item further comprises the insertion position, and
   wherein the inserting a multimedia player corresponding to the identified type of the multimedia resource into the page comprises inserting the multimedia player corresponding to the type of the multimedia resource at a corresponding position of the page.

10. The page display method according to claim 5, wherein if the information indicates that the page comprises a multimedia resource, the method further comprises obtaining, from the server, a client program and a related cascading style sheet (CSS); and
    wherein searching the page for the multimedia resource, and identifying the type of the multimedia resource are performed based on the client program and the CSS.

11. A client system, comprising a processor and a non-transitory computer-readable storage medium storing instructions that, when executed by the processor, cause the client system to perform operations comprising:
    obtaining a page visit request of a page;
    sending the page visit request to a server;
    obtaining, from the server, information relating to whether the page comprises a multimedia resource;
    in response to determining that the information indicates that the page comprises a multimedia resource:

obtaining, from the server, resource information relating to a title,
an address, a size, and an insertion position of the multimedia resource, in a header of a page file of the page;
identifying, from at least a portion of the resource information, a type of the multimedia resource;
inserting a multimedia player corresponding to the identified type of the multimedia resource based on the insertion position, the inserting comprising:
  if the type of the multimedia resource is a music resource, appending a child node corresponding to the multimedia player as a last child of a parent node corresponding to a DOM object of the page; and
  if the type of the multimedia resource is a video resource, appending a child node corresponding to the multimedia player before at least one other child node of a parent node corresponding to a DOM object of the page; and
displaying the page with the multimedia resource using the inserted multimedia player; and
in response to determining that the information indicates that the page does not comprise a multimedia resource, displaying the page to a user.

* * * * *